United States Patent [19]

Erben et al.

[11] Patent Number: 5,667,169
[45] Date of Patent: Sep. 16, 1997

[54] DOOR SYSTEM, PARTICULARLY FOR A PASSENGER PLANE

[75] Inventors: Hannes Erben; Wolfgang Buchs, both of Donauwoerth, Germany

[73] Assignee: Eurocopter Deutschland GmbH, Munich, Germany

[21] Appl. No.: 423,508

[22] Filed: Apr. 17, 1995

[30] Foreign Application Priority Data

Apr. 16, 1994 [DE] Germany ............... 44 13 307.3

[51] Int. Cl.$^6$ ............................................. B64C 1/14
[52] U.S. Cl. ...................... 244/129.5; 244/129.4; 49/254; 49/255
[58] Field of Search .................. 244/129.5, 129.4; 49/32, 254, 255, 256, 394; 74/483 R, 483 K

[56] References Cited

U.S. PATENT DOCUMENTS

| 3,762,099 | 10/1973 | Chaisson ................ 49/32 |
| 4,720,065 | 1/1988 | Hamatani . |
| 4,944,473 | 7/1990 | Kallies et al. ............ 244/129.5 |
| 5,031,863 | 7/1991 | Noble ..................... 244/129.5 |
| 5,163,639 | 11/1992 | Herrman et al. ........... 49/254 |
| 5,316,241 | 5/1994 | Kallies et al. ............ 244/129.5 |
| 5,379,971 | 1/1995 | Kim et al. ............... 244/129.5 |

FOREIGN PATENT DOCUMENTS

| 0 321 994 | 6/1989 | European Pat. Off. . |
| 1 804 480 | 8/1969 | Germany . |
| 2 151 907 | 11/1972 | Germany . |
| 40 22 067 | 1/1992 | Germany . |

*Primary Examiner*—Andres Kashnikow
*Assistant Examiner*—Tien Dinh
*Attorney, Agent, or Firm*—Evenson, McKeown, Edwards & Lenahan, P.L.L.C.

[57] ABSTRACT

A door system, particularly for a passenger plane, includes bearing and guiding device which operates between the door leaf and the door frame, as well as a lifting device which is arranged between the bearing and guiding device and the door leaf. The lifting device moves the door leaf at the end of the closing movement transversely to the moving path (B) of the guiding device with a form-locking engagement with door-frame-fixed receiving elements into the completely closed position and, at the start of the opening operation, in the opposite lifting direction (A) out of the form-locking engagement. The lifting device contains lifting kinematics for the control of the door blade lifting movement and an assigned lifting drive. In order to ensure a high safety standard and, at the same time, a simple weight-saving construction, the door leaf is provided with an electric drive unit for the lifting drive and a mechanically actuated lift securing device which can be cleared in parallel to the electric control of the lifting drive by a door opening command and locks the lifting device in the completely closed position automatically in a door-leaf-fixed manner.

20 Claims, 3 Drawing Sheets

DOOR SYSTEM, PARTICULARLY FOR A PASSENGER PLANE

BACKGROUND AND SUMMARY OF THE INVENTION

This invention relates to a door system, particularly for a passenger plane and, more particularly, to a door system including a bearing and guiding device acting between the door leaf and the door frame. A lifting device is arranged between the bearing and guiding device and the door leaf. The lifting device moves the door leaf at the end of the closing movement transversely to the moving path of the guiding device with a form-locking engagement with door-frame-fixed receiving elements into a completely closed position. At the start of the opening operation, the lifting device moves the door in the opposite lifting direction out of the form-locking engagement. The lifting device contains lifting kinematics for the control of the door leaf lifting movement and an assigned lifting drive.

Known swing-open door systems of this type, as they are used in modern passenger planes such as the airbus family, are of the so-called "plug type"; i.e., in the completely closed position, the door leaf is lowered by means of edge-side, door-leaf-fixed contact mountings in a form-locking engagement with corresponding abutments fastened to the fuselage structure in the area of the door cut-out. This is done in order to transmit the high pressure forces, which, as a result of the pressure difference between the interior and exterior cabin pressure, act upon the door leaf during the flight. The forces are transmitted directly and without the insertion of mechanically moved locking elements, from the door leaf to the fuselage structure. As a result, the forces prevent the springing-open of the door when there is a failure of the locking mechanism.

For the opening operation, the door leaf must first be lifted out of the form-locking engagement with the abutments before, subjected to the control of a bearing and guiding device acting between the door leaf and the fuselage structure, it will then be swung open out of the door cut-out toward the outside. This movement is essentially perpendicular to the lifting movement. The door will then be moved in the lateral direction in parallel to the fuselage into the full opening position.

For safety reasons, these known door systems have no outside-energy-operated, electric or pneumatic lifting drives. Instead, the lifting movement is mechanically caused purely by means of a manually operated lifting mechanism in the form of a lifting linkage. The lifting linkage is arranged on the interior side of the door leaf and is connected, by means of a lifting-power-boosting torsion spring drive, on the one side, to a four-bar linkage and, on the other side, to an operating lever situated on the exterior and interior side of the door leaf. The four-bar linkage acts between the door leaf and the bearing and guiding device and controls the lifting movement. So that, as a result of vibration and shock effects, the door leaf cannot by itself move out of the fully lowered lifting position and therefore be released from the form-locking engagement with the fuselage-fixed abutments, locking elements are also provided within the scope of the lifting linkage on the edge side on the door leaf. By these means, the door leaf is locked in the completely closed position in a non-liftable manner on the door frame. In the case of such a door system, it is a problem that a large number of very precise and stable linkage parts are required for the lifting linkage, and correspondingly high weight and mounting expenditures are needed such that the manufacturing costs and mainly the total weight of such a door system becomes undesirably high.

There is therefore needed a door system of the above-mentioned type which meets high safety requirements and nevertheless has a mechanically simple construction and a clearly reduced dead weight.

According to the present invention, these needs are met by a door system including a bearing and guiding device acting between the door leaf and the door frame. A lifting device is arranged between the bearing and guiding device and the door leaf. The lifting device moves the door leaf at the end of the closing movement transversely to the moving path of the guiding device with a form-locking engagement with door-frame-fixed receiving elements into a completely closed position. At the start of the opening operation, the lifting devices moves the door in the opposite lifting direction out of the form-locking engagement. The lifting device contains lifting kinematics for the control of the door leaf lifting movement and an assigned lifting drive. The door leaf is provided with an electric drive unit for the lifting drive and a mechanical lift securing device which can be released in parallel to actuation of the electric control of the lifting drive by a door opening command, and locks the lifting device in the completely closed position automatically in a door-leaf-fixed manner.

According to the present invention, as a result of the claimed combination of an electric lifting drive and a mechanical lift securing device, the strict safety requirements for a passenger plane door system are fully met. This is because of the fact that the lift securing device has priority over the electric lifting drive and the lift securing device and the lift drive within the system and, with respect to functions, are completely separated from one another. They can be coupled with one another only externally by means of a door opening command so that a faulty control of the electric lifting drive within the system cannot spread to the lift securing device. An additional aspect with respect to safety requirements is that, because of the dual, on the one hand, electrical and, on the other hand, mechanical lift control, the risk of a faulty door opening lift caused by a purely mechanical or a purely electrical system disturbance is effectively counteracted.

Based on this safety concept, a considerable constructional simplification and weight reduction is achieved by the fact that high-expenditure transmission linkages for the lift driving forces and for the door-frame-side non-liftable locking of the door leaf in the completely closed position are eliminated. Instead, the lift securing device which, because of its self-locking effect also takes over the task of the door leaf locking, together with the singular electric drive unit, is connected directly to the lifting kinematics on the door leaf. Therefore, for the actuating of the lift, in addition to the uncomplicated electric wiring of the lifting drive, only a slightly loaded and therefore low-weight and low-cost releasing mechanism for the lift securing device is required. This ensures an easy and fast operation of the door system.

In order to provide a space and weight saving construction, the lifting kinematics preferably consist of a four-bar linkage arranged between the bearing and guiding device and the door leaf. An electric linear actuator is provided as a lifting drive which acts on a diagonal of the four-bar linkage.

In the case of a complete power failure of the primary current supply as well as of the standby current supply, or in the case of another electric disturbance of the lifting drive, in order for the door leaf to be lifted at least once without any effort from the "plug position", in another, particularly preferred embodiment of the invention, a self-supplying emergency lifting drive is provided on the door leaf in addition to the electric drive. The self-supplying lifting drive consists of a compressed-air motor which is arranged in addition to the electric drive unit and is activated by an emergency opening command with the simultaneous clearing of the lift securing device. The self-supplying unit has an assigned compressed-air accumulator which is preferably fixed to the door leaf. In order to secure the door leaf not only in the lowered, completely closed position, but also during the swinging-open in the lifted position with respect to a faulty activation of the electric lifting drive, the lifting device is preferably in both lift end positions by means of the lift securing device automatically locked fixed to the door leaf.

For the simultaneous control of the mechanical lift securing device and of the electric lift drive, it is expedient that at least on the interior side of the door leaf, a hand lever is provided which is connected with the lift securing device by way of a clearing linkage. The hand lever controls the lift drive by way of electric contacts.

Advantageously, the door may preferably be operated from both sides of the door leaf independently of one another. For this purpose, the door leaf is provided with a door-leaf-interior-side and a door-leaf-exterior-side hand lever. Being mutually mechanically uncoupled, the two hand levers are jointly connected to the clearing linkage of the lift securing device.

Finally, a constructionally particularly robust and mechanically simple further embodiment of the lift securing device consists of the fact that this lift securing device includes a locking disk which is provided with at least one locking element, is coupled with the lifting device in a rotationally fixed manner, and is rotated during a lifting movement about a door-leaf-fixed axis. It also includes a locking lever which is disposed on the door leaf, interacts in at least one lifting end position automatically under prestress with the locking element and locks the locking disk non-rotatably on the door leaf. The locking lever can be withdrawn by means of the release mechanism of the lift securing device from the engaging position with the locking element.

Other objects, advantages and novel features of the present invention will become apparent from the following detailed description of the invention when considered in conjunction with the accompanying drawings.

DETAILED DESCRIPTION OF THE DRAWINGS

Figure 1:
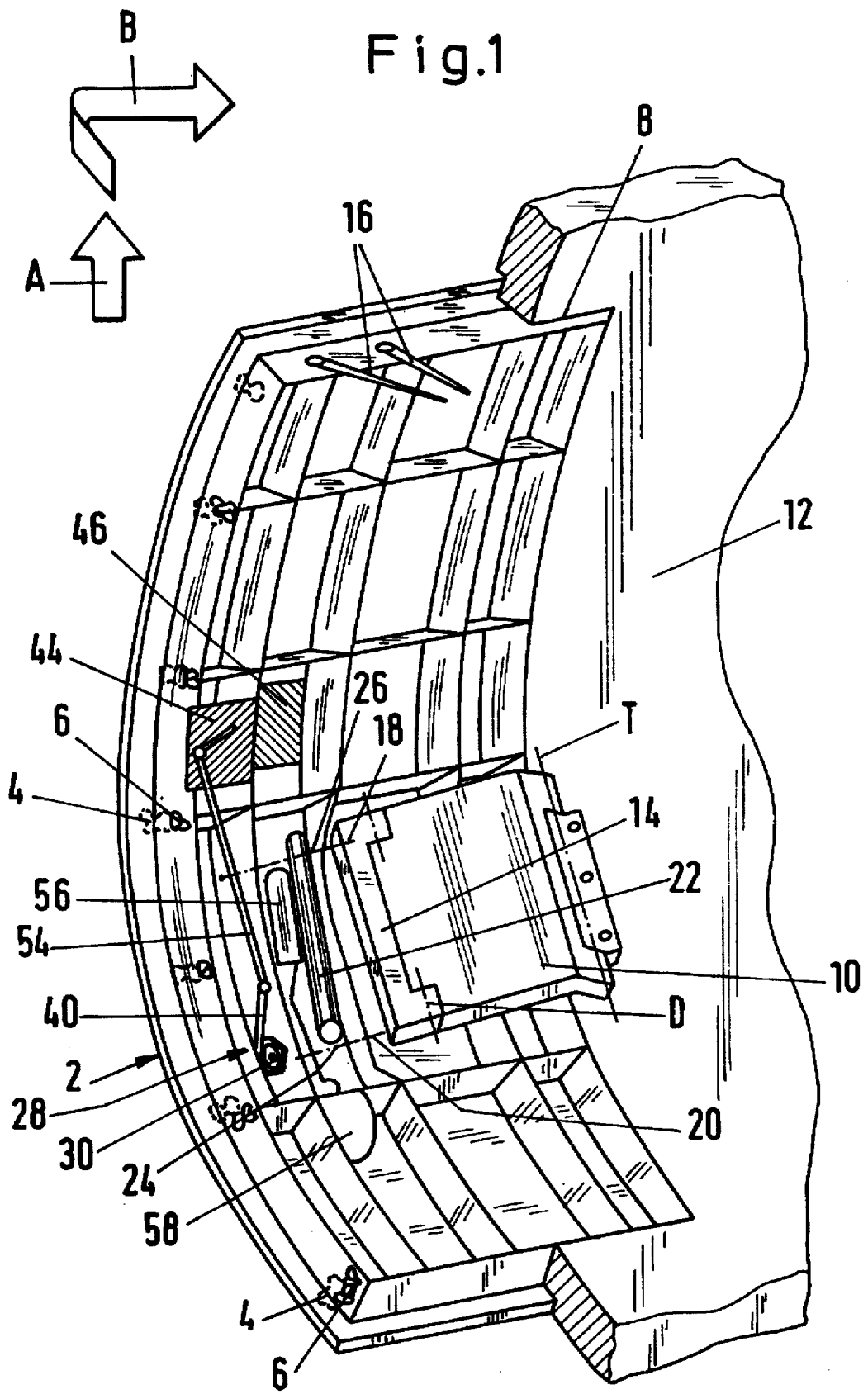
FIG. 1 is a schematic representation of a swing-open door system for a passenger plane according to the invention, the door system is shown in a completely closed position in which the door leaf is lowered into the lower lifting end position into the door cut-out of the airplane fuselage.

The door system illustrated in the figures is of the so-called "plug type"; i.e., in the completely closed position, the door leaf 2 is lowered in a form-locking engagement between door-frame fixed receiving elements 4 (shaded in FIG. 1) and abutments fastened to the door leaf edge. For opening, the door leaf is first lifted out of the form-locking engagement with the receiving elements 4 with respect to the door cut-out 8 (direction of arrow A) before it is swung out of the door cut-out to the outside. It can then be moved essentially in parallel to the exterior side of the fuselage into the fully opened position (direction of arrow B).

The bearing and guiding device required for this purpose includes a bearing arm 10 which, on one side, is fixed to the door frame 12 so that it can be swivelled about an axis of rotation T and which, on the other side, is provided with a bearing piece 14. The bearing piece 14 is connected with the bearing arm 10 so that it is hinged about the axis of rotation D. Two control rods 16 are operative between the door leaf 2 and the door frame 12, by which the door leaf 2 is guided in the moving phase B.

Figure 2:
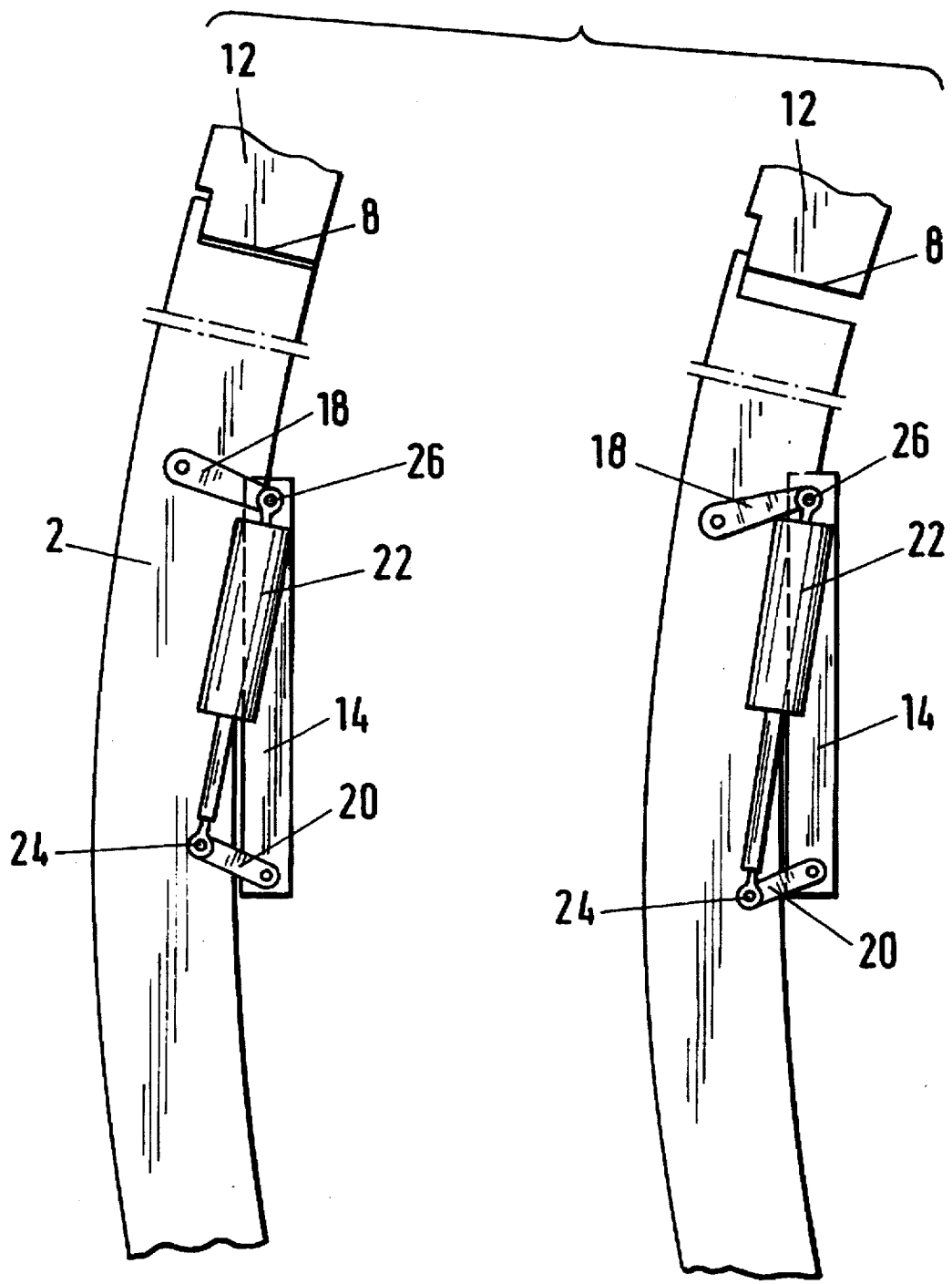
FIG. 2 is a partial schematic lateral view of the door leaf, the lifting kinematics and the electric lifting drive in the lifted and in the lowered lifting end position.
Figure 3:
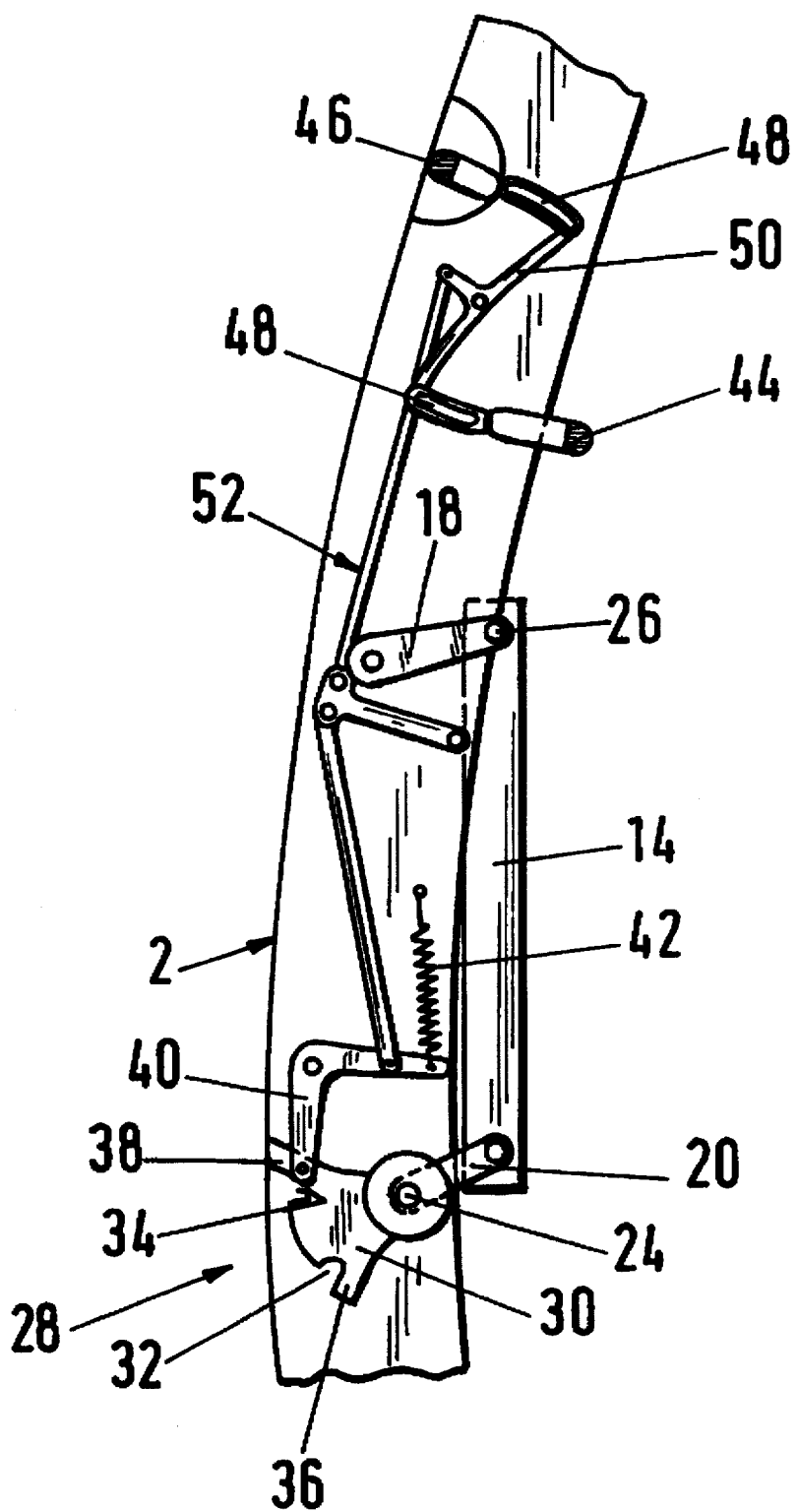
FIG. 3 is a schematic view of the lift securing device and the assigned clearing mechanism in the lowered lift end position.

The lifting movement of the door leaf 2 is controlled by lifting kinematics in the form of a four-bar linkage which is arranged between the door leaf 2 and the bearing piece 14. As illustrated best in FIGS. 2 and 3, the linkage consists of an upper longer and a lower shorter lift control arm 18 and 20 forming the lifting kinematics. The lifting kinematics 18, 20 are each connected in a rotatable manner, on the one side, with the door leaf and, on the other side, with the bearing piece 14.

An electric linear actuator 22 is included directly into the lifting kinematics 18, 20. The linear actuator 22 is arranged on the diagonal of the four-bar linkage and, on one side, is connected to the door-leaf-side joint shaft 24 of the lower lift control rod 20. On the other side, the actuator 22 is connected to the bearing-piece-side joint shaft 26 of the upper lift control rod 18. The linear actuator 22 is tension-loaded under the effect of the door leaf weight when the door leaf 2 is lifted and lowered. The linear actuator 22 is of a conventional self-locking construction and is provided with an electric limit stop in the lowered and lifted position of the door leaf 2.

In addition, the door system includes a lift securing device which, as a whole, has the reference number 28 and acts within the system in parallel to the lifting drive 22. The lift securing device 28 locks the lifting kinematics 18, 20 in both lift end positions automatically non-swivellably on the door leaf 2. As seen most clearly from FIG. 3, the lift securing device 28 includes a sector-shaped locking disk 30 which is non-rotatably connected with the one lift control rod 20 of the lifting kinematics by way of the joint shaft 24 and has locking openings 32 and 34 and radially projecting stop bosses 36 and 38 for the lifted and lowered lifting end position. The lift securing device further includes a locking lever 40 which can be swivelled about a door-leaf-fixed axis and which is held in contact on the locking disk 30 by means of a tension spring 42. In the case of a faulty activation of the linear actuator 22, the lifting motion of the door leaf 2 is limited by the locking lever 40 and the stop bosses 36 and 38. In addition, in both lifting end positions, the locking lever 40, under the effect of a spring force, engages in one of the stop openings 32 and 34 of the locking disk 30 so that the door leaf 2 is locked independently of the linear actuator 22 against a lifting movement with respect to the door frame 12.

For actuating the lift, the lift securing device 28 is mechanically cleared using a door-leaf-interior-side or a door-leaf-exterior-side hand lever 44 and 46. Simultaneously, the linear actuator 22 is electrically controlled by way of hand-lever-operated contacts (not shown). As illustrated best in FIG. 3, the hand levers 44 and 46 are each connected by way of a dead travel connection (oblong hole 48) to a two-armed rocker lever 50 which is connected with the locking lever 40 by way of a clearing linkage 52. When one of the hand levers 44 or 46 is pulled, the rocker lever 50 will swivel and the locking lever 40 is rotated by way of the clearing linkage 52 out of the lock with the locking disk 30. In this position, the pulled-out hand lever 44, 46 can be tilted upwards or downwards, whereby a corresponding electric caliper is closed for the upward and downward stroke of the linear actuator 22. Because of the mechanical uncoupling of the two hand levers 44 and 46, when one hand lever is pulled, the respective inoperative other hand lever remains in the pulled-back inoperative position.

So that, in the case of a total power failure or a disturbance of the electric lifting system, the door can be opened at least once without any effort, the door leaf 2 is provided, in a tandem construction to the electric lifting drive 22, with a self-supplying emergency drive 54. The emergency drive 54 consists of a compressed-air motor 56, which normally runs along "empty" on the same axis as the electric motor of the lifting drive 22, and of an assigned compressed-air accumulator 58 fastened to the door leaf 2. When the electric lifting system fails, the emergency lifting drive 54 is activated by the operation of an inner or outer emergency lifting lever (not shown) mounted in a respective covered manner next to the hand levers 44 and 46, whereby the lift securing device 28 is cleared and simultaneously a normally closed locking valve between the compressed-air accumulator 58 and the compressed-air motor 56 is opened up.

So that a lowering of the door leaf 2 is prevented while the door is swung open (moving phase B according to FIG. 1), in the electric circuit for the linear actuator 22, an electric caliper (not shown) is provided on the bearing arm 10. As long as the door leaf 2 is lifted but not swung-open, the caliper is closed. When the door leaf 2 is swung open to the outside, the caliper interrupts the electric circuit for the linear actuator 22 and an operating of the hand levers 44 or 46 will have no effect because the self-locking linear actuator 22 prevents a lowering. In the lifted condition, the door can be swung open and closed manually. However, at least in an emergency, the door is moved along the moving path B with an outside-power actuated swivel drive (not shown) which acts between the bearing arm 10 and the door frame 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A door system for an aircraft having a bearing and guiding device acting between a door leaf and a door frame, and lifting kinematics arranged between the bearing and guiding device and the door leaf, said lifting kinematics moving the door leaf transversely to a moving path of the guiding device at an end of a closing movement into a form-locking engagement with door-frame-fixed receiving elements for a completely closed position, said lifting kinematics further moving the door leaf in an opposite lifting direction out of the form-locking engagement at a start of an opening operation, said lifting kinematics comprising:

an electric drive unit operatively coupled with the door leaf to provide a lifting device;

a mechanically actuated lift securing device, in combination with said electric drive unit, operable to be released in parallel with an electric activation of said electric drive unit, said lift securing device automatically locking the lifting kinematics in a door-leaf-fixed manner in a completely closed position.

2. A door system according to claim 1, wherein, in addition to the electric drive unit, a pneumatic emergency lift drive is arranged on the door leaf and is activated by an emergency opening command with the simultaneous clearing of the lift securing device and has an assigned compressed-air accumulator for an at least one-time opening lift of the door leaf.

3. A door system according to claim 2, wherein the lifting device is automatically locked in a door-leaf-fixed manner by means of the lift securing device in both lifting end positions.

4. A door system according to claim 1, wherein the lifting device is automatically locked in a door-leaf-fixed manner by means of the lift securing device in both lifting end positions.

5. A door system for an aircraft having a bearing and guiding device acting between a door leaf and a door frame, a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively coupled with the door leaf to provide said lifting drive;

a mechanically actuated lift securing device acting in parallel with an electric actuation of the lifting drive by a door opening command, said lift securing device automatically locking the lifting device in the completely closed position in a door-leaf-fixed manner; and wherein the lifting kinematics include a four-bar linkage arranged between the bearing and guiding device and the door leaf, and wherein said electric drive unit is an electric linear actuator which operates on a diagonal of the four-bar linkage.

6. A door system according to claim 5, wherein the lifting device is automatically locked in a door-leaf-fixed manner by means of the lift securing device in both lifting end positions.

7. A door system according to claim 5, wherein, for actuating the lift, at least one hand lever is provided which is accessible from an interior side of the door leaf, is connected with the lift securing device by way of a clearing linkage, and controls the lifting drive by way of electric contacts.

8. A door system according to claim 7, wherein, for actuating the lift, the one hand lever which is accessible from the interior side of the door and a hand lever which is accessible from an exterior side of the door are provided which, in a mutually mechanically uncoupled manner, are jointly connected to the clearing linkage.

9. A door system according to claim 5, wherein the lift securing device comprises:

a locking disk which is provided with at least one locking element, is coupled with the lifting device in a rotationally locking manner, and is rotated during each lifting movement about a door-leaf-fixed axis; and a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

10. A door system for an aircraft having a bearing and guiding device acting between a door leaf and a door frame, a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively coupled with the door leaf to provide said lifting drive;

a mechanically actuated lift securing device acting in parallel with an electric actuation of the lifting drive by a door opening command, said lift securing device automatically locking the lifting device in the completely closed position in a door-leaf-fixed manner; and wherein, for actuating the lifting device, at least one hand lever is provided which is accessible from an interior side of the door leaf, is connected with the lift securing device by way of a clearing linkage, and controls the lifting drive by way of electric contacts.

11. A door system according to claim 10, wherein, for actuating the lift, the one hand lever which is accessible from the interior side of the door and a hand lever which is accessible from an exterior side of the door are provided which, in a mutually mechanically uncoupled manner, are jointly connected to the clearing linkage.

12. A door system according to claim 11, wherein the lift securing device comprises:

a locking disk which is provided with at least one locking element, is coupled with the lifting device in a rotationally locking manner, and is rotated during each lifting movement about a door-leaf-fixed axis; and a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

13. A door system according to claim 10, wherein the lift securing device comprises:

a locking disk which is provided with at least one locking element, is coupled with the lifting device in a rotationally locking manner, and is rotated during each lifting movement about a door-leaf-fixed axis; and a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

14. A door system for an aircraft having a bearing and guiding device acting between a door leaf and a door frame, a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively coupled with the door leaf to provide said lifting drive;

a mechanically actuated lift securing device acting in parallel with an electric actuation of the lifting drive by a door opening command, said lift securing device automatically locking the lifting device in the completely closed position in a door-leaf-fixed manner;

wherein, in addition to the electric drive unit, a pneumatic emergency lift drive is arranged on the door leaf and is activated by an emergency opening command with the simultaneous clearing of the lift securing device and has an assigned compressed-air accumulator for an at least one-time opening lift of the door leaf; and wherein, for actuating the lifting device, at least one hand lever is provided which is accessible from an interior side of the door leaf, is connected with the lift securing device by way of a clearing linkage, and controls the lifting drive by way of electric contacts.

15. A door system according to claim 14, wherein, for actuating the lift, the one hand lever which is accessible from the interior side of the door and a hand lever which is accessible from an exterior side of the door are provided which, in a mutually mechanically uncoupled manner, are jointly connected to the clearing linkage.

16. A door system for an aircraft having a bearing and guiding device acting between a door leaf and a door frame a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively coupled with the door leaf to provide said lifting drive;

a mechanically actuated lift securing device acting in parallel with an electric actuation of the lifting drive by a door opening command said lift securing device automatically locking the lifting device in the completely closed position in a door-leaf-fixed manner;

wherein the lifting device is automatically locked in a door-leaf-fixed manner by means of the lift securing device in both lifting end positions; and wherein, for actuating the lifting device, at least one hand lever is provided which is accessible from an interior side of the door leaf, is connected with the lift securing device by way of a clearing linkage, and controls the lifting drive by way of electric contacts.

17. A door system according to claim 16, wherein, for actuating the lift, the one hand lever which is accessible from the interior side of the door and a hand lever which is accessible from an exterior side of the door are provided which, in a mutually mechanically uncoupled manner, are jointly connected to the clearing linkage.

18. A door system for an aircraft having a bearing and guiding device acting between a door leaf and a door frame a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an of an opening operation, said lifting device containing lifting kinematics for a control of the door leaf lifting movement and a lifting drive assigned thereto, said door system comprising:

an electric drive unit operatively couple with the door leaf to provide said lifting drive;

a mechanically actuated lift securing device acting in parallel with an electric actuation of the lifting drive by a door opening command, said lift securing device automatically locking the lifting device in the completely closed position in a door-leaf-fixed manner;

wherein the lift securing device comprises:
- a locking disk which is provided with at least one locking element, is coupled with the lifting device in a rotationally fixed manner, and is rotated during each lifting movement about a door-leaf-fixed axis; and
- a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

19. A door system for an aircraft having a bearing guiding device acting between a door leaf and a door frame, a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively couple with the door leaf to provide said lifting drive;

a mechanically actuated lift securing device acting in parallel with an electric actuation of the lifting drive by a door opening command said lift securing device automatically locking the lifting device in the completely closed position in a door-leaf-fixed manner;

wherein in addition to the electric drive unit, a pneumatic emergency drive is arranged on the door leaf and is activated by an emergency opening command with the simultaneous clearing of the lift securing device and has an assigned compressed-air accumulator for an at least one-time opening lift of the door leaf;

wherein the lift securing device comprises:
- a locking disk which is provided with at least one locking element, is coupled with the lifting device in a rotationally locking manner, and is rotated during each lifting movement about a door-leaf-fixed axis; and
- a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

20. A door system for an aircraft having a bearing and guiding device acting between a door leaf and a door frame, a lifting device arranged between the bearing and guiding device and the door leaf, said lifting device moving the door leaf transversely to a moving path of the guiding device at an end of a closing movement into a form-locking engagement with door-frame-fixed receiving elements for a completely closed position, said lifting device moving the door leaf in an opposite lifting direction out of the form-locking engagement at a start of an opening operation, said lifting device containing lifting kinematics for a control of the door leaf lifting movement and a lifting drive assigned thereto, said door system comprising:

an electric drive unit operatively coupled with the door leaf to provide said lifting drive;

a mechanically actuated lift securing device acting in parallel with an electric actuation of the lifting drive by a door opening command, said lift securing device automatically locking the lifting device in the completely closed position in a door-leaf-fixed manner;

wherein the lifting device is automatically locked in a door-leaf-fixed manner by means of the lift securing device in both lifting end positions;

wherein the lift securing device comprises:
- a locking disk which is provided with at least one locking element, is coupled with the lifting device in a rotationally locking manner, and is rotated during each lifting movement about a door-leaf-fixed axis; and
- a locking lever which is disposed on the door leaf, automatically interacts with the locking element at least in one lifting end position under prestress, non-rotatably locks the locking disk on the door leaf and can be withdrawn from the engaging position with the locking element by means of a mechanical clearing linkage of the lift securing device.

* * * * *